UNITED STATES PATENT OFFICE.

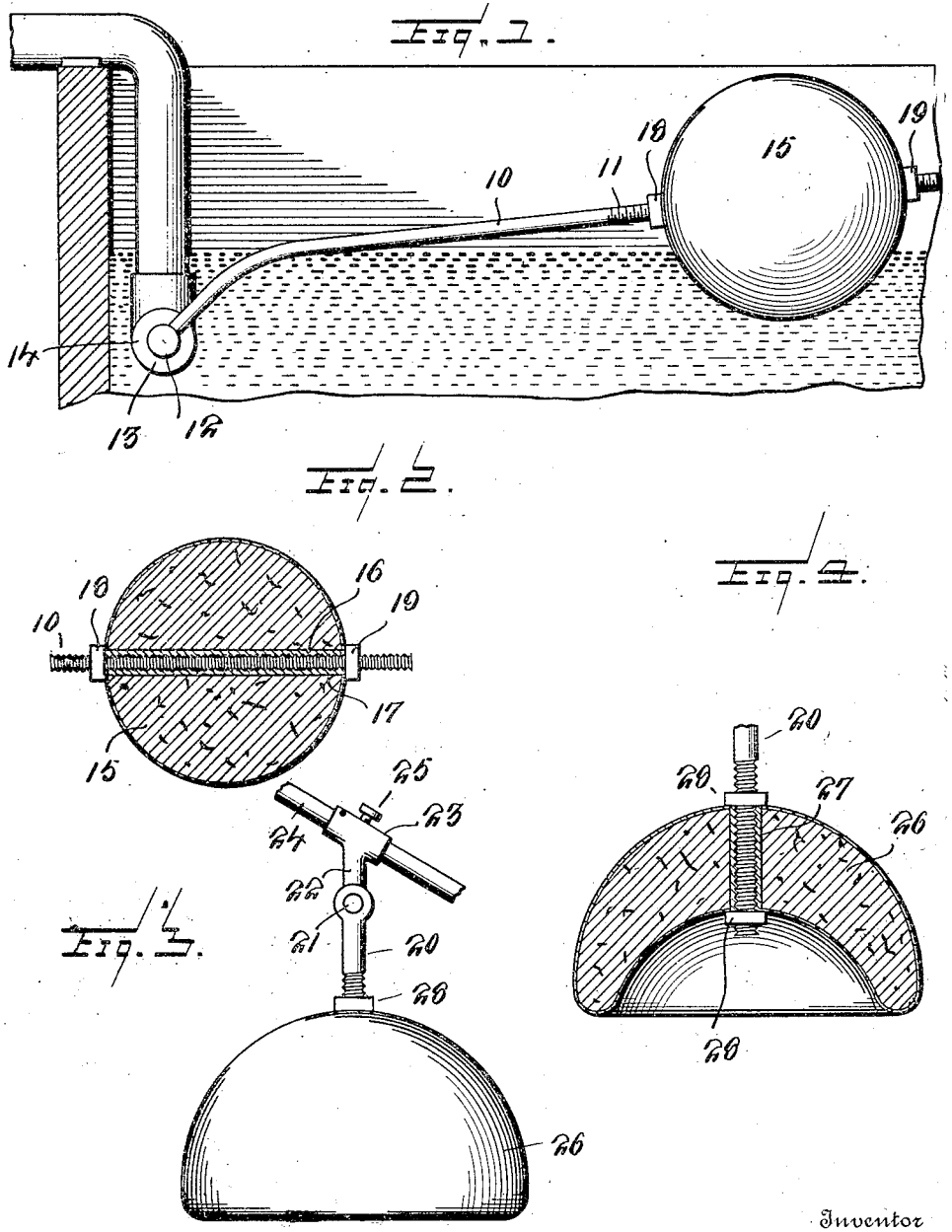

NATHAN MORITZKY, OF BROOKLYN, NEW YORK.

BALL-FLOAT.

1,049,131.  Specification of Letters Patent.  Patented Dec. 31, 1912.

Application filed January 12, 1912. Serial No. 670,849.

*To all whom it may concern:*

Be it known that I, NATHAN MORITZKY, a citizen of the United States, residing at Brooklyn, in the county of Kings and State of New York, have invented new and useful Improvements in Ball-Floats, of which the following is a specification.

An object of the invention is to provide a ball float for use in tanks to operate the valve thereof.

My invention embodies more particularly a ball float arranged to operate the valve of a closet tank or the like, in proportion to the amount of water admitted to the tank, the ball being adjustable for the purpose of increasing or decreasing the stroke, thus controlling the operation of the valve.

In the further disclosure of the invention reference is to be had to the accompanying drawings constituting a part of this specification, in which similar characters of reference denote corresponding parts in all the views, and in which—

Figure 1 is a vertical sectional view of a closet tank showing my ball float mounted therein and connected with the usual valve. Fig. 2 is a vertical sectional view of the ball float. Fig. 3 is a side elevation of a modified form of my device. Fig. 4 is a fragmentary vertical sectional view of the modified form disclosed in Fig. 3.

Referring to the views and more particularly to Figs. 1 and 2 I provide a rod 10 having an end 11 thereof threaded, the other end of the said rod being secured to a member 12 adapted for pivotal connection with a casing 13 of the usual valve 14, the valve 14 being of any preferred type wherein the ball float is employed to operate the valve. A ball 15 is provided with a diametrically extending opening 16 in which is mounted a tube 17 provided with threads on the interior surface thereof and adapted for threaded engagement with the threads 11 on the rod 10, an adjusting nut 18 being threadedly mounted on the rod 10 on one side of the ball 15 and a second adjusting nut 19 being threadedly mounted on the rod 10 on the other side of the ball 15.

Referring more particularly to Fig. 1 it will be seen that by operating the nuts 18 and 19 on the rod 10 and imparting rotation to the ball 15, the distance of the ball 15 from the member 12 can be varied, thus increasing or decreasing the stroke or swing of the rod 10 to conform to tanks of various sizes, it being understood that when the nuts 18, 19 are screwed to engage the periphery of the ball 15, the mentioned nuts will act as locking members to retain the ball in the desired position. Thus by providing a means whereby the swing of the rod can be increased or decreased, adjusting means for the valve is provided whereby the valve may be operated to close or open earlier or later.

In Figs. 3 and 4 I disclose a modified form of my device in which I provide a threaded rod 20, similar to the rod 11, the said rod 20 being provided with a socket 21 and adapted for pivotal connection with a member 22, embodying a sleeve 23 slidably mounted on a lever 24, the adjustment of the member 22 on the lever 24 being accomplished through the medium of an adjusting screw 25 mounted on the member 22 and adapted to engage the lever 24 to retain the member 22 in rigid engagement with the lever 24. A hemispherically shaped ball member 26 has a tube 27 extending therethrough and threaded on the interior surface thereof for threaded engagement with the rod 20, adjusting nuts 28 being mounted to threadedly engage the rod 20 to retain the ball member 26 in locked engagement with the rod 20. The adjustment of the ball member 26 on the rod 20 is the same as the adjustment of the ball 15 on the rod 10 as has been mentioned heretofore and the member 22 can be adjusted on the lever 24 by operating the screw 25 so as to permit a sliding movement of the member 22 on the lever 24, the screw 25 being reëngaged with the lever 24 to rigidly retain the member 22 in a fixed position on the lever 24 when the ball member 26 has been moved to the desired position.

From the foregoing description it will be readily understood that in the construction disclosed in Figs. 1 and 2 a single adjusting means for the ball member is provided while in the construction disclosed in Figs. 3 and 4 the ball member can be adjusted in a vertical direction.

The ball members 15 and 26 are preferably made of cork and are dipped in a paraffin solution to render the same impervious to water, thus providing an efficient and durable ball float.

I claim:—

1. In a device of the class described the combination with a rod, of a ball member adjustably mounted thereon, a lever, a sleeve member pivotally connected to the said rod and slidably engaging the said lever and means for retaining the said sleeve member in rigid engagement with the said lever.

2. In a device of the class described the combination with a rod, of a ball member adjustably mounted thereon, a lever, a sleeve member pivotally connected to the said rod and slidably engaging the said lever, means for retaining the said sleeve member in rigid engagement with the said lever and means for threaded engagement with the said rod and adapted to engage the said ball member to retain the same in rigid engagement with the said rod.

In testimony whereof I affix my signature in presence of two witnesses.

NATHAN MORITZKY.

Witnesses:
ADOLF SUSMAN,
MAX WALLACH.